Jan. 30, 1968  D. E. ROHAUS  3,366,717
METHOD AND APPARATUS FOR CONTROLLING HOT-BRIQUETTING OPERATION
Filed May 18, 1964
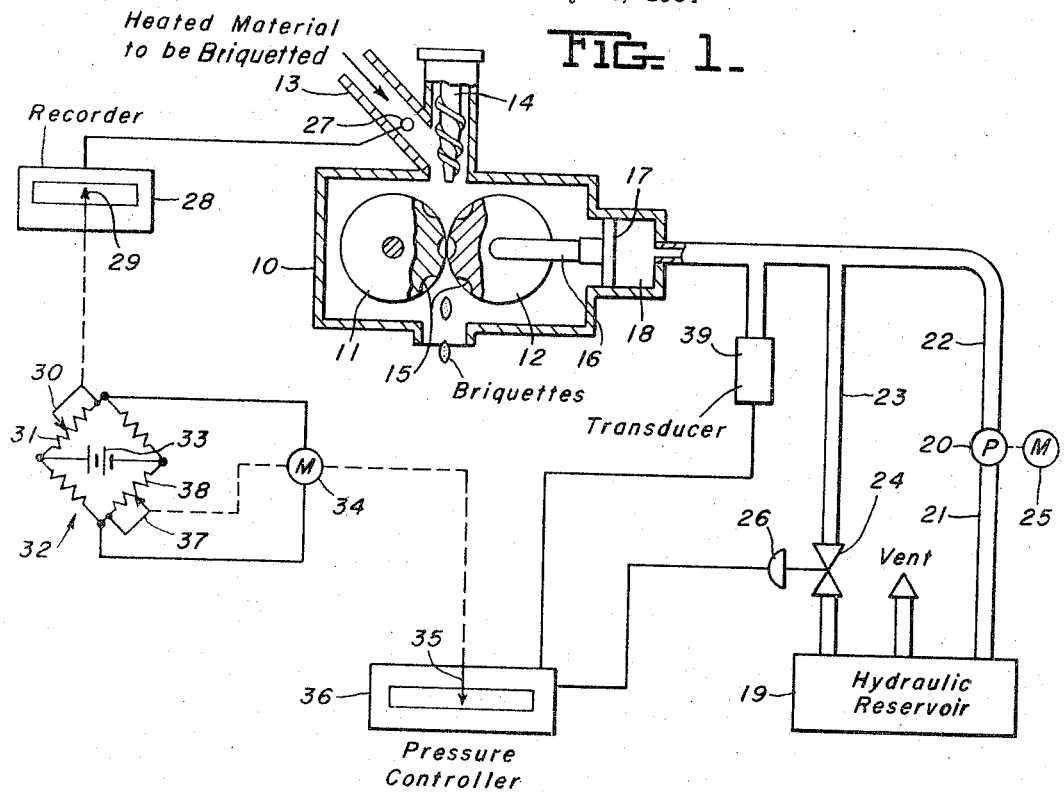
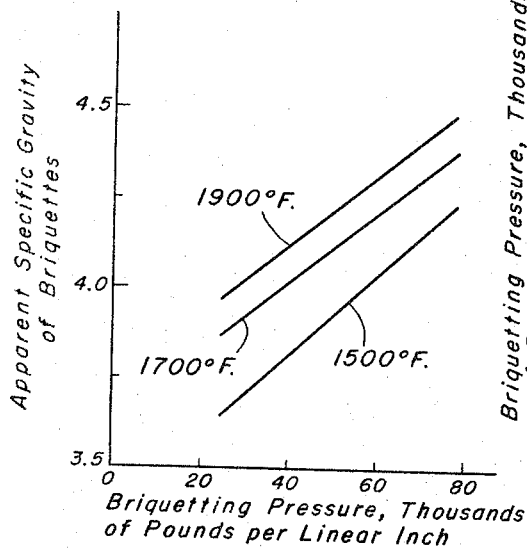
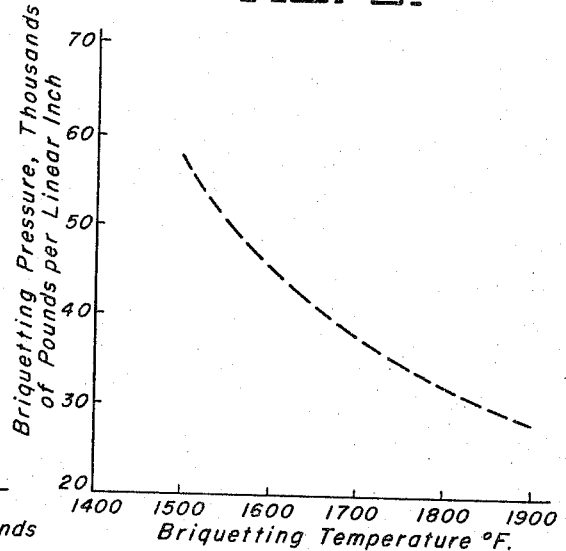
INVENTOR.
DONALD E. ROHAUS
By Donald G. Dalton
Attorney

United States Patent Office 3,366,717
Patented Jan. 30, 1968

3,366,717
METHOD AND APPARATUS FOR CONTROLLING HOT-BRIQUETTING OPERATION
Donald E. Rohaus, Monroeville, Pa., assignor to United States Steel Corporation, a corporation of Delaware
Filed May 18, 1964, Ser. No. 368,221
8 Claims. (Cl. 264—40)

ABSTRACT OF THE DISCLOSURE

Hot-briquetting of iron ore fines controlled to produce briquettes of uniform specific gravity. Temperature of incoming ore fines measure and the measurement used to adjust the pressure on the briquetting rolls through an automatic control circuit. The higher the temperature, the less pressure needed.

---

The invention relates to an improved method and apparatus for controlling a hot-briquetting operation.

A conventional roll-type briquetting press includes a pair of power-driven rolls which are journaled on parallel axes and have series of mating cavities around their circumferences. Fine material is fed between the rolls and formed into pillow-shaped briquettes within the cavities. Some materials, such as iron ore, advantageously are briquetted at relatively high temperatures, commonly about 1500 to 1900° F. To produce briquettes of a desired uniform apparent specific gravity at high temperatures, it is necessary to maintain a predetermined relation between the temperature of the material and the pressure exerted by the briquetting rolls. The usual practice has been to measure the temperature of the incoming material just before it reaches the rolls and adjust the heating apparatus as needed to maintain a selected constant temperature. The roll pressure also is maintained constant. I have observed this form of control is not altogether satisfactory. One difficulty is that thre is a considerable time lag between an adjustment in the heating apparatus and a corresponding temperature change in material reaching the briquetting rolls.

An object of the present invention is to provide an improved method and apparatus for controlling the pressure-temperature relation in a briquetting operation using a roll-type press in which I overcome the disadvantages of previous controls.

A further object is to provide a control method and apparatus of the foregoing type in which adjustments are made in the pressure exerted by the briquetting rolls inversely with changes in the temperature of material reaching the press, rather than adjusting the heating apparatus.

A more specific object is to provide a control method and apparatus of the foregoing type in which the temperature of incoming material is measured continuously, the roll pressure is applied hydraulically, and the temperature-measuring means and the hydraulic means are operatively connected, whereby the pressure is adjusted quickly and automatically with temperature changes to produce briquettes of desired apparent specific gravity.

In the drawing:

FIGURE 1 is a schematic view of a portion of a roll-type briquetting installation equipped with my improved control apparatus;

FIGURE 2 is a series of curves which show the relation between briquetting pressure and apparent specific gravity of an exemplary iron ore briquetted at various temperatures; and FIGURE 3 is a curve which shows the pressure-temperature relation to be maintained to produce briquettes of 4.0 apparent specific gravity with this ore.

FIGURE 1 shows a briquetting press which includes a housing 10, a pair of conventional power driven rolls 11 and 12, a feed chute 13, and a screw feeder 14. The rolls have mating briquette-forming cavities 15 around their circumferences. Heated material to be briquetted (for example iron ore fines at 1500 to 1900° F.) flows gravitationally down the chute to the screw feeder, which forces the material between the rolls. Hot briquettes discharge from the bottom of the housing, usually to a suitable cooling apparatus (not shown). Roll 11 is journaled in fixed bearings (not shown). The other roll 12 is journaled in bearings which are mounted on a piston rod 16. This rod is carried by a piston 17 mounted for reciprocable movement in a hydraulic cylinder 18.

I supply hydraulic fluid to cylinder 18 from a reservoir 19 and pump 20. A pipe 21 extends from the reservoir to the intake side of the pump, and a pipe 22 from the discharge side to cylinder 18. A return pipe 23 extends from pipe 22 back to the reservoir and contains an adjustable valve 24. A motor 25 continuously drives pump 20, whereby the pump forces a continuous stream of hydraulic fluid through pipes 22 and 23. Valve 24 is equipped with a positioner 26, which adjusts the valve to vary the resistance it offers to return of fluid through pipe 23 to the reservoir. The pressure in cylinder 18 and the pressure exerted by the briquetting rolls 11 and 12 on the material vary with the position of adjustment of valve 24.

My control apparatus includes a temperature-sensing element 27, for example a thermocouple, mounted in the feed chute 13 and a single-point strip chart recorder 28 operatively connected to this element. The recorder has a pointer 29 which I mechanically connect to a slider 30. The slider cooperates with a slide wire 31 which forms one arm of a bridge circuit 32. I energize the bridge circuit from a power source 33, and I connect a reversible motor 34 across the circuit. Thus the motor runs in one direction or the other only when the circuit is out of balance. I mechanically connect motor 34 to a set point 35 of a pressure controller 36 and to another slider 37. The latter slider cooperates with a slide wire 38 which forms another arm of the bridge circuit 32. I connect a transducer 39 to pipe 22 and to the pressure controller 36, whereby the transducer transmits an electric signal to the controller proportional to the briquetting pressure. I also connect the pressure controller 36 to the valve positioner 26.

The curves of FIGURE 2 show how the apparent specific gravity of briquettes of an exemplary hematite ore varies with the roll pressure at various temperatures. An apparent specific gravity of about 4.0 is usually considered optimum for iron ore briquettes. If the ore is briquetted at 1500° F., a briquetting pressure of about 57,000 pounds per linear inch of effective roll width is required to produce this specific gravity. At temperatures of 1700° F. and 1900° F. the pressures required are about 38,000 pounds and 27,000 pounds respectively. As FIGURE 3 shows, the pressure-temperature curve required to produce briquettes of 4.0 specific gravity from this ore is a form of hyperbola. The slide wire 38 has a nonlinear resistance characteristic to match this curve.

My control apparatus automatically adjusts the briquetting pressure inversely with changes in temperature of the material to produce briquettes of predetermined apparent specific gravity. For example, if the temperature of the material in chute 13 drops, the temperature-sensing element 27 transmits a lower voltage signal to the recorder 28. Pointer 29 of the recorder moves to the left and also moves the slider 30 to the left along the slide wire 31. The electrical resistance offered by this arm of the bridge circuit 32 drops, whereupon the circuit is unbalanced. Motor 34 is energized in a direction to move the slider 37 to the right along the slide wire 38 until the bridge circuit is restored to balance. The motor also moves the set point 35 of the pressure controller 36 to the right to a higher pressure setting. The extent of movement is nonlinear and follows a curve such as FIGURE 3 shows. The pressure signal from the transducer 39 no longer matches the setting of the controller 36, whereupon the controller transmits a signal to the valve positioner 26 to decrease the flow of hydraulic fluid through valve 24. The pressure in cylinder 18 increases until it reaches the new setting of controller 36. The reverse action takes place when the temperature of the incoming material rises.

From the foregoing description it is seen that my invention affords a simple method and apparatus for maintaining a proper pressure-temperature in a hot-briquetting operation to produce briquettes of predetermined apparent specific gravity. The various instruments I use in this apparatus are known per se, and I have not described them in detail. By way of example, valve 24 and its positioner 26 can be a Foxboro Control Valve, Type V-4; recorder 28 can be a Leeds and Northrup "Speedomax G" Model S; pressure controller 36 can be a Foxboro pneumatic model M-40; and transducer 39 can be Model No. BLH 201907, Baldwin-Lima-Hamilton Company. Hence the apparatus can be assembled from components readily available commercially.

While I have shown and described only a single embodiment of my invention, it is apparent that modifications may arise. Therefore, I do not wish to be limited to the disclosure set forth but only by the scope of the appended claims.

I claim:

1. In a briquetting process in which fine material at a relatively high temperature is fed between a pair of power driven rolls which have mating briquette-forming cavities around their circumferences, and pressure is applied to said rolls, whereby the material is formed into briquettes in said cavities, a control method comprising measuring the temperature of the material before it reaches said rolls, and adjusting the pressure inversely with changes in the temperature to maintain the briquettes at a predetermined apparent specific gravity.

2. A method as defined in claim 1 in which pressure is applied hydraulically to said rolls by way of a continuously driven pump having a return line, and temperature changes automatically adjust the resistance to flow through said line.

3. In a briquetting installation which includes a pair of power driven rolls having mating briquette-forming cavities around their circumferences, means for feeding fine material at a relatively high temperature between said rolls, and means for applying pressure to said rolls to form the material into briquettes in said cavities, the combination therewith of a control apparatus comprising means for measuring the temperature of the material before it reaches said rolls, means for varying the pressure applied to said rolls, and means operatively connected with said temperature-measuring means and with said pressure-varying means for adjusting the pressure inversely with temperature changes to produce briquettes of predetermined apparent specific gravity.

4. In a briquetting installation which includes a pair of power driven rolls having mating briquette-forming cavities around their circumferences, means for feeding fine material at a relatively high temperature between said rolls, hydraulic means mounting one of said rolls, and means for supplying fluid under pressure to said hydraulic means and thereby applying pressure to said rolls to form the material into briquettes in said cavities, the combination therewith of a control apparatus comprising means for measuring the temperature of the material before it reaches said rolls, means in said fluid-supplying means for varying the pressure, and means operatively connected with said temperature-measuring means and with said pressure-varying means for adjusting the pressure inversely with temperature changes to produce briquettes of predetermined apparent specific gravity.

5. A combination as defined in claim 4 in which said hydraulic means includes a cylinder, a reciprocable piston within said cylinder, and a piston rod carried by said piston on which the roll is journaled, and in which said fluid-supplying means includes a reservoir, a pump for delivering fluid from said reservoir to said cylinder, and a return pipe for returning fluid from the pump to the reservoir, and in which said pressure-varying means includes a valve in said return pipe.

6. A combination as defined in claim 5 in which said operatively connected means includes a recorder connected with said temperature-measuring means, a bridge circuit connected to said recorder to be unbalanced by temperature changes, a reversible motor connected to said circuit to operate when the circuit is unbalanced to restore the balance, a pressure controller connected to said motor to have its setting changed when the motor operates, and a transducer connected to said cylinder and said controller, said controller being connected with said valve to adjust the valve to bring the pressure on the transducer to the controller setting.

7. In a briquetting installation which includes a pair of power driven rolls having mating briquette-forming cavities around their circumferences, means for feeding fine material at a relatively high temperature between said rolls, a hydraulic cylinder, a reciprocable piston and piston rod in said cylinder, one of said rolls being mounted on said piston rod, a reservoir for hydraulic fluid, a pump, pipes connecting said reservoir, pump and cylinder, a return pipe connecting said first-named pipes and said reservoir, and an adjustable valve in said return pipe, said pump supplying fluid from said reservoir through said first-named pipes to said cylinder to apply pressure to said rolls, the position of adjustment of said valve controlling the pressure thus applied, the combination therewith of a control apparatus comprising means for measuring the temperature of the material before it reaches said rolls, a pressure controller, means operatively connected to said temperature-measuring means and said controller for setting the controller in accordance with the temperature, means connecting said first-named pipes and said controller transmitting a signal to the controller representative of the actual roll pressure, and means connecting said controller and said valve for adjusting the valve to bring the actual pressure into conformity with the setting of the controller.

8. A combination as defined in claim 7 in which said operatively connected means includes a recorder connected to said temperature-measuring means, a normally balanced bridge circuit connected to said recorder to be unbalanced by temperature changes, and a motor connected to said circuit to operate when the circuit is unbalanced to restore the balance, said motor being connected to said controller to set the latter.

References Cited

UNITED STATES PATENTS 2,485,128  10/1949  Adams    264—111
2,766,109  10/1956  Komarek et al.    75—3

(Other references on following page)

UNITED STATES PATENTS

| | | | |
|---|---|---|---|
| 3,116,966 | 1/1964 | Rohaus | 75—3 |
| 3,174,846 | 3/1965 | Brisse et al. | 75—3 |
| 3,193,377 | 7/1965 | Guseman et al. | 18—9 |
| 3,328,843 | 7/1967 | Murphy et al. | 18—21 |
| 3,328,987 | 7/1967 | Feraci | 72—8 |

FOREIGN PATENTS

| | | |
|---|---|---|
| 1,134,505 | 8/1962 | Germany. |

OTHER REFERENCES

Control Engineering, "Instrumentation News: Diamond glass improves quality with Honeywell glass tank control system"; "Honeywell controls help Texas Eastern achieve 'packaged' station goal," vol. 10, No. 9, September 1963, pp. 36 and 37.

Brower, Allen S., "controlling a complete hot strip mill" in Control Engineering, vol. 10, No. 10, October 1963, pp. 57–63.

ALEXANDER H. BRODMERKEL, *Primary Examiner.*

P. E. ANDERSON, *Assistant Examiner.*